United States Patent

Scheufler

[11] Patent Number: 5,785,470
[45] Date of Patent: Jul. 28, 1998

[54] ADJUSTABLE RETRIEVER

[76] Inventor: Richard Scheufler, 3209 Hartland Center Rd., Collins, Ohio 44826

[21] Appl. No.: 613,317

[22] Filed: Mar. 11, 1996

[51] Int. Cl.[6] .................................................. B23D 37/00
[52] U.S. Cl. ........................... 409/287; 408/153; 409/285
[58] Field of Search .................................. 409/279–287, 409/264–267, 204; 408/153

[56] References Cited

U.S. PATENT DOCUMENTS

| | | | |
|---|---|---|---|
| 1,588,716 | 6/1926 | Ferris | 409/287 |
| 2,292,440 | 8/1942 | Gotberg | 409/264 |
| 2,975,682 | 3/1961 | Carlson | 409/267 |
| 4,266,894 | 5/1981 | Zuzanov et al. | 409/287 |
| 4,349,952 | 9/1982 | Decker et al. | 409/279 |
| 4,367,992 | 1/1983 | Soroka | 409/287 |
| 4,810,140 | 3/1989 | Copen | 409/279 |
| 5,184,985 | 2/1993 | Varinelli et al. | 409/265 |

FOREIGN PATENT DOCUMENTS 503657  3/1976  U.S.S.R. ........................... 409/286

*Primary Examiner*—Daniel W. Howell
*Assistant Examiner*—Christopher Kirkman
*Attorney, Agent, or Firm*—Jerry Semer

[57] ABSTRACT

The invention is basically a device that allows an individual to align the broaching tool more accurately. The invention begins with a base plate that is attached to the retriever base or puller head of the broach machine. Within the base plate is a large broach stick opening through which the retriever end or the puller end of the broach tool is placed. Attached to the base plates are four rails around the large openings. The adjustment plate is a plate that fits on top of the base plate and within the area created by the four rails. In the center of the adjustment plate is a large opening for the attachment of the retriever end or puller end of the broach tool. Also the adjustment plate has openings for attachment through bolts to the base plate. In the four rails there are also openings for set screws that pass through the rails and make contact with the adjustment plate fit within the area created by the rails. These set screws allow the retriever plate to be adjusted in all directions perpendicular to the broach. Once the broach tool is fully adjusted the adjustment plate bolts that attach it to the base plate are tighten down to hold that adjustment plate in place. The adjustment plate can be easily readjusted by loosening up the bolts that hold the adjustment plate to the base plate and making the adjustment with the four sets of set screws.

14 Claims, 7 Drawing Sheets

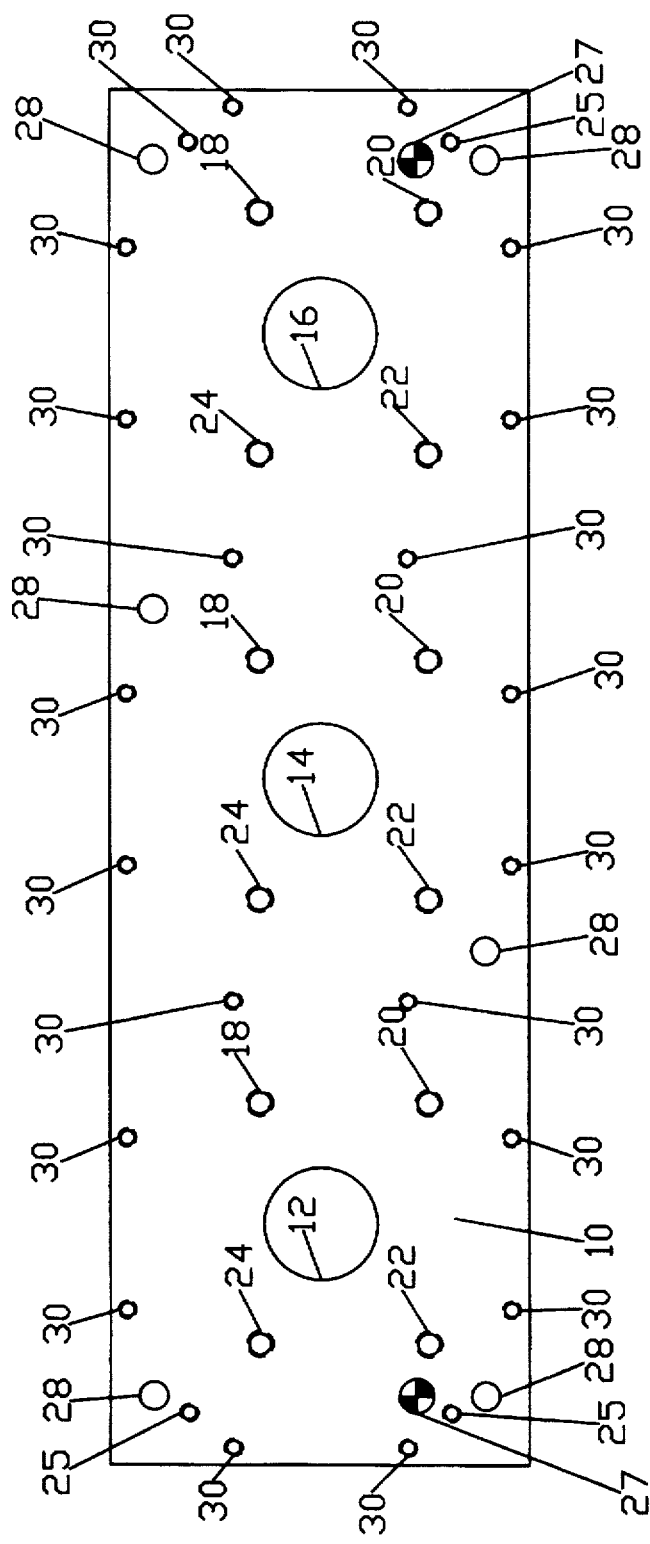
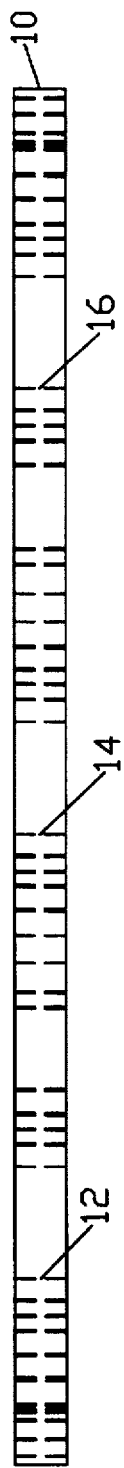
FIGURE 1
FIGURE 2

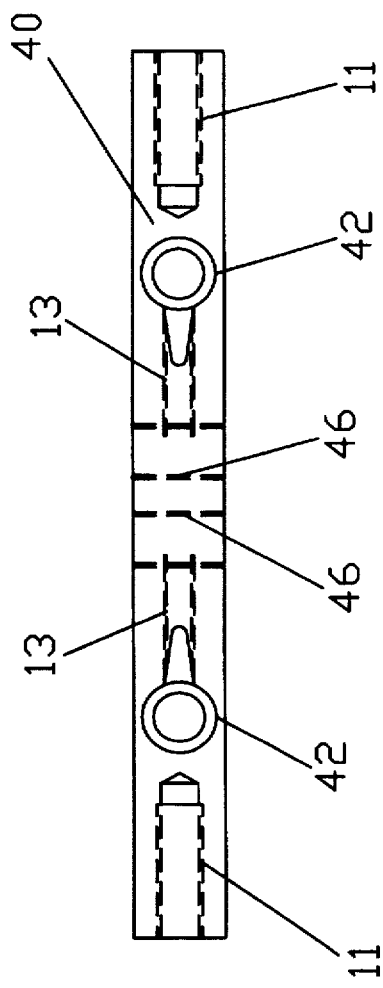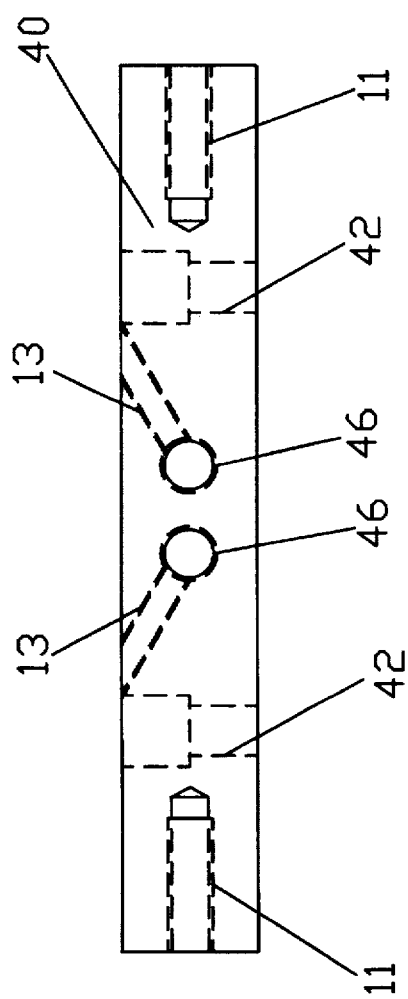

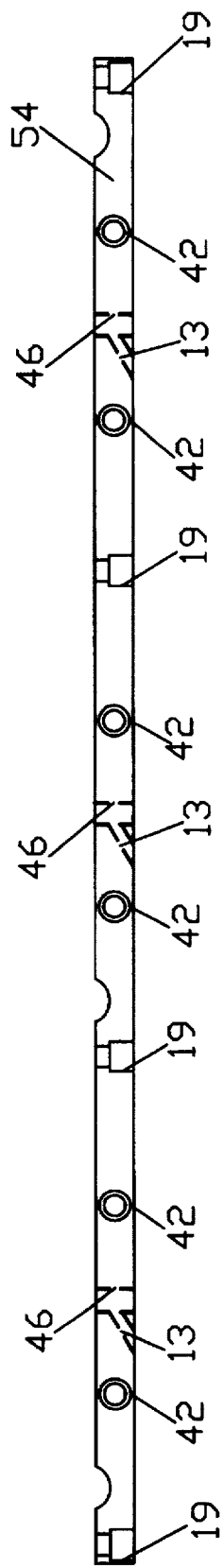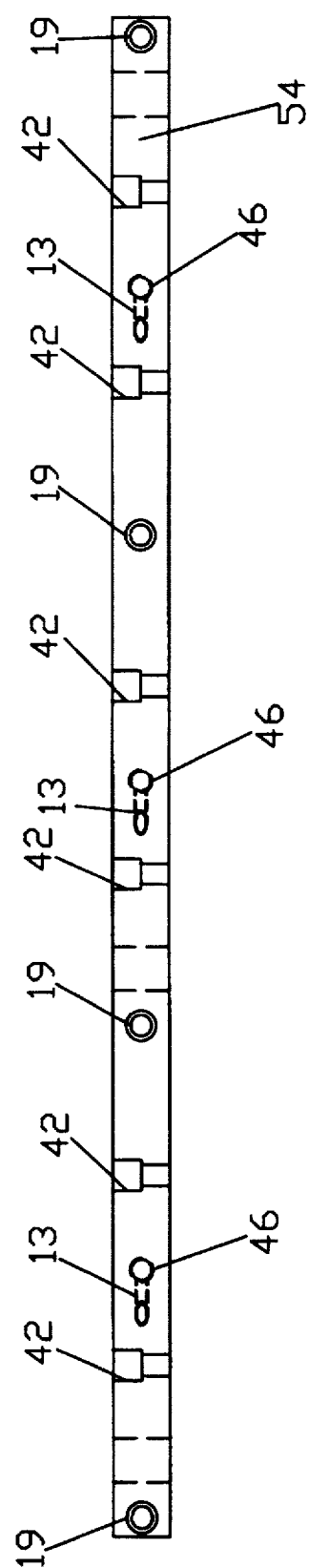

1
ADJUSTABLE RETRIEVER

FIELD OF INVENTION

This invention relates to broaching and broach machines and more particularly to the adjustment of the broaching tool in the broach machine.

BACKGROUND OF THE INVENTION

Broach machines are generally broken down into three parts. A handler section, a table or work piece holder, and a puller section. There are basically two types of broach machines. The first being where the work piece is stationary and the broach tool is pulled through it. The second which is the newer or more common style is where you secure the broach tool and push the work piece past the broaching tool.

This invention relates to the handler and puller sections of the broach machine. The broaching tool is held in place at one end by the handler section and the other end by the puller section. The handler has a retriever base and a retriever which is attached to the broaching tool. The puller section has a puller head that is attached to the broaching tool. This invention can be used in either the handler section or the puller section. It is a mechanism that allows the individual to align the broach stick more accurately.

Old style retriever bases and puller heads are fixed location. Thus, it would be impossible to adjust the retriever or puller head and align the broach. If you have any adjustment generally what would be done is that you would add shims under the thrust bushing or under the wear rail that the part sets on to change the alignment of the workpiece. This alignment is guess work at best and could not compensate for problems such as the bottom set of guide bars being out of parallel with the top set of the retriever guide bars. Thus, one of the objectives of this invention is to create a adjustable retriever base or puller head that is engineered so that each and every retriever base or puller head on said broach machine can be fully adjusted.

SUMMARY OF THE INVENTION

The invention is basically a device that allows an individual to align the broaching tool more accurately. The invention begins with a base plate that is attached to the retriever base or puller head of the broach machine. Within the base plate is a large broach stick opening through which the retriever end or the puller end of the broach tool is placed. Attached to the base plates are four rails around the large openings. The adjustment plate is a plate that fits on top of the base plate and within the area created by the four rails. In the center of the adjustment plate is a large opening for the attachment of the retriever end or puller end of the broach tool. Also the adjustment plate has openings for attachment through bolts to the base plate. In the four rails there are also openings for set screws that pass through the rails and make contact with the adjustment plate fit within the area created by the rails. These set screws allow the retriever plate to be adjusted in all directions perpendicular to the broach. Once the broach tool is fully adjusted the adjustment plate bolts that attach it to the base plate are tighten down to hold that adjustment plate in place. The adjustment plate can be easily readjusted by loosening up the bolts that hold the adjustment plate to the base plate and making the adjustment with the four sets of set screws.

BRIEF DESCRIPTION OF THE DRAWINGS

FIG. 1 is the top view of the base plate of the invention.
FIG. 2 shows the side view of this base plate.

2

Figure 3:
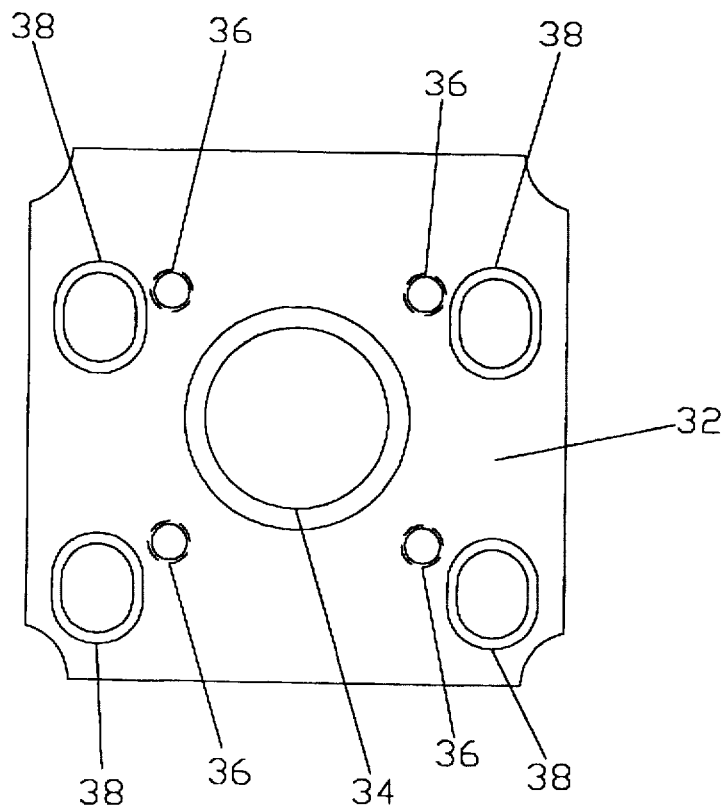
Figure 4:
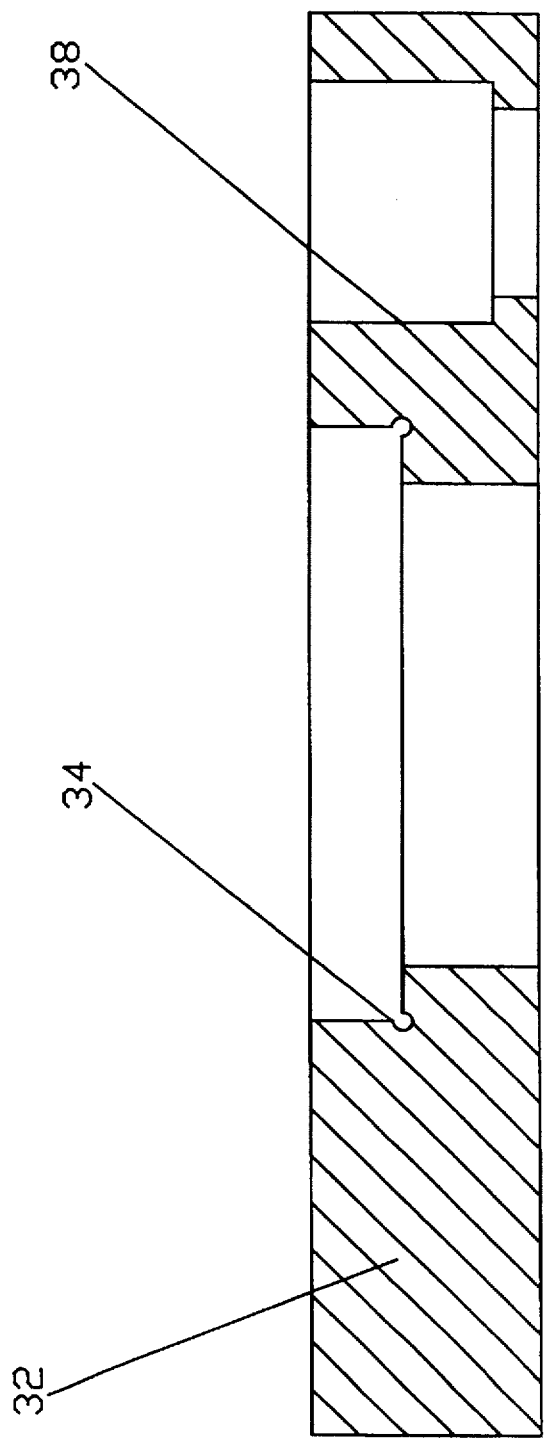
Figure 7A:
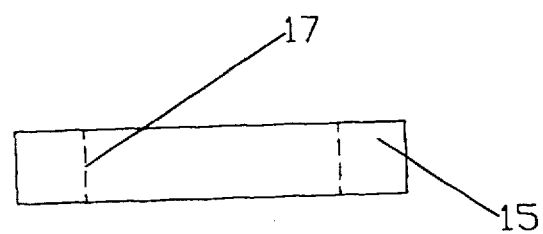
Figure 7:
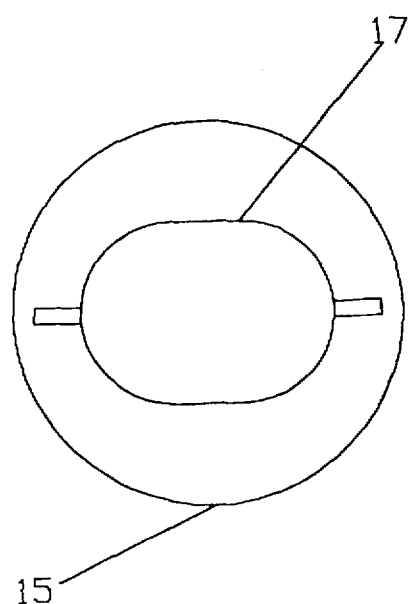
Figure 10:
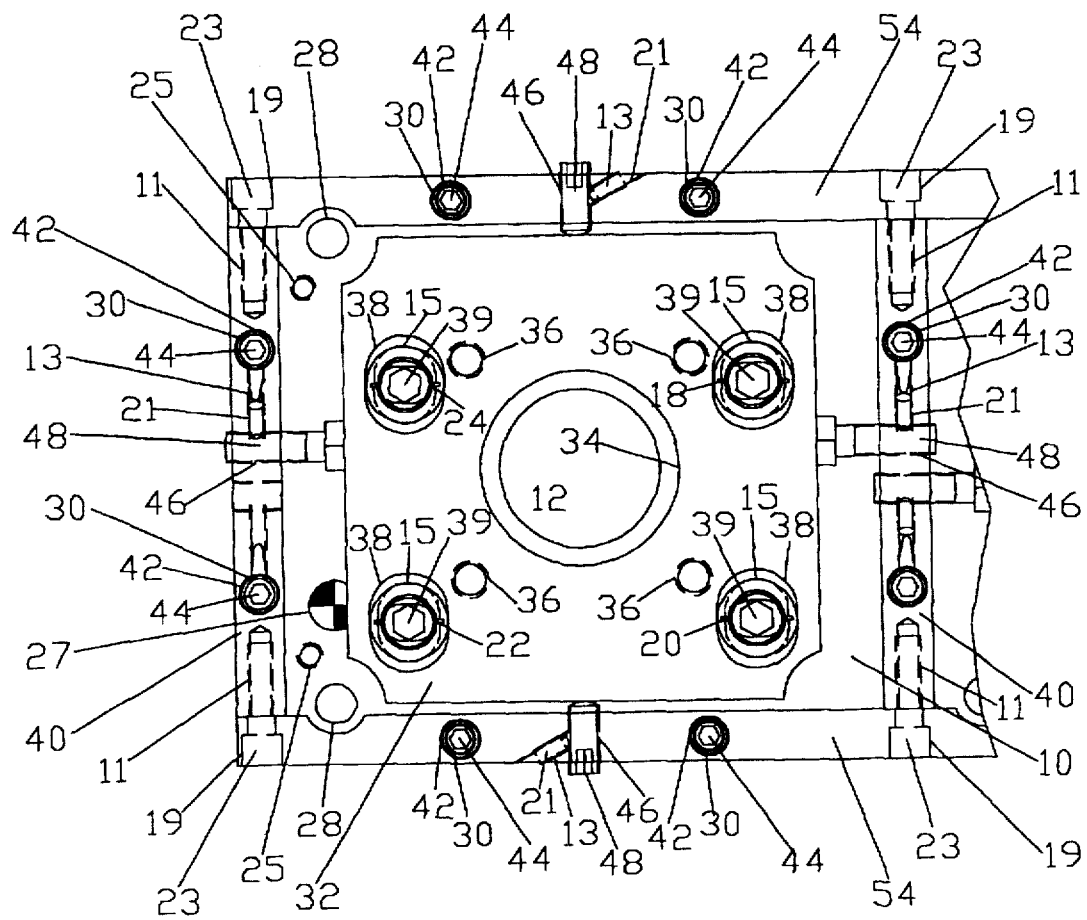
Figure 10:
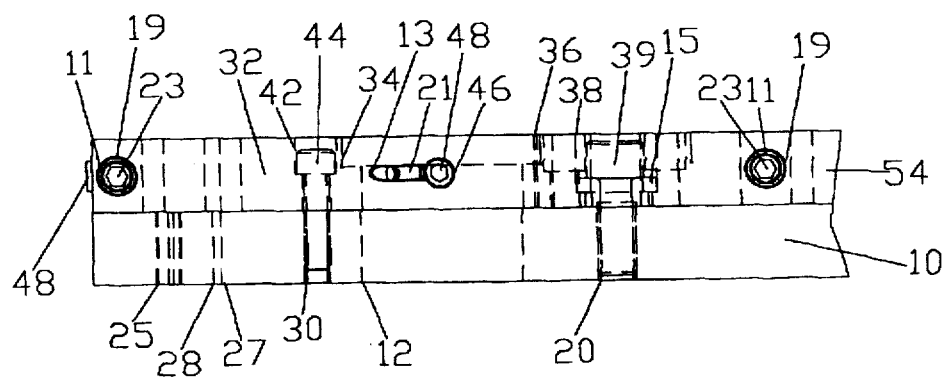

FIG. 3 shows a top view of the adjustment plate 32.
FIG. 4 is a sectional view of the adjustment plate along lines AA of FIG. 3.
FIG. 5 is a top view of the short retriever rail.
FIG. 6 is a side view of the short retriever rail.
FIG. 7 is the top view of the washer 17.
FIG. 7a is the side view of the washer 17.
FIG. 8 is the top view of the long retriever rail.
FIG. 9 is the side view of the long retriever rail.
FIG. 10 is a top view of the invention.
FIG. 10a is a side view of the invention.

DETAILED DESCRIPTION OF THE PREFERRED EMBODIMENT

FIG. 1 shows a large rectangular base plate 10. In FIG. 2 the side view of the base plate 10 shows the base plate 10 as a flat slab.

In FIG. 1 the base plate has three large openings 12, 14 and 16. Through these openings the retriever end or puller end of the broaching tool passes. This base plate is designed for a broach machine with three sticks or broaching tools. Thus it has three large openings. The base plate 10 has the number of large openings that corresponds to the number of broach sticks. Thus a broach machine with one stick will have one opening and a broach machine with ten sticks will have 10 openings. In the preferred embodiment around each of the openings are four threaded adjustment plate attachment openings 18, 20, 22 and 24. The four adjustment plate attachment openings 18, 20 and 22 and 24 are adapted to take the adjustment plate attachment bolts 39 shown in FIG. 10. In the four corners of the base plate 10 are attachment openings 26 that are adapted to take attachment bolt 25. The base plate 10 is attached to the broach machine with attachment bolt 25. On the outer perimeter of the base plate are the rail attachment opening 30. These rail attachment openings 30 are adapted to take the rail attachment bolts 44 that attach the rails shown in FIG. 5 through 8 to the base plate 10.

FIG. 3 shows a top view of the adjustment plate 32. In the center of the adjustment plate 32 is a large broach tool counter bore 34. Through this large broach tool counter bore 34 the broaching tool is mounted. Around the broach tool counter bore 34 are four small retriever attachment screw openings 36. These retriever attachment screw openings 36 are threaded and adapted to take the broach attachment screw which is designed to attach the broach to the adjustment plate 32. In the four corners of the adjustment plate are four elongated and oversized adjustment plate attachment counter bores 38. Through these elongated and oversized adjustment plate attachment counter bores 38 pass the adjustment plate attachment lock down bolts 39 that correspond within the adjustment plate attachment openings 18, 20, 22 and 24 on the base plate 10.

FIG. 4 is a sectional view of the adjustment plate along lines AA of FIG. 3. This shows that the adjustment plate opening 34 is a counter bore with its upper portion having a larger diameter then the lower portion. This adjustment plate opening 34 can take other shapes and is designed to hold the broach tool securely.

FIG. 4 also shows that the oversized adjustment plate attachment counter bore 38 has a larger diameter on the upper than on the lower portion. Within the larger diameter the upper portion is fitted for a special washer 15 as shown in FIG. 7 and FIG. 7a. FIG. 7 shows the special washer 15 as being circular with an oval opening. This washer 15 along with the oversized oval shaped counter bore 38 allows the adjustment plates to be adjusted and then the adjustment plate locker down bolt 39 is tightened down and the bolt and washer holds the plate securely. The washer 15 is specially designed to allow the adjustment plate 32 to be adjusted. The oversized adjustment plate attachment counter bore 38 is as pointed out above is elongated in one direction. The opening in the washer 15 is also elongated. When the washer is placed in the counter bore the elongation of the oval opening 17 in the washer 15 is set perpendicular to the elongation of the oversized adjustment plate attachment counter bore 38 so that the adjustment plate 32 can be adjusted both directions in a plane.

FIG. 5 is a top view of the short adjustment rail 40. On the top view we see two adjustment rail attachment openings 42. These adjustment rails attachment openings 42 are adapted to handle the adjustment rail attachment bolts 44. The short adjustment rail base plate attachment bolt 44 can be threaded into the rail attachment opening 30. The adjustment rail attachment bolts 44 pass through the short adjustment rail opening 42 and are threaded into the rail attachment opening 30 to hold the short adjustment rail in place on the base plate 10.

FIG. 6 show the side view of the short adjustment rail 40. In FIG. 6 the short adjustment rail 40 has two short adjustment rail set screw openings 46. Both of these openings are threaded and adapted to hold the short adjustment rail set screws 48.

Both FIGS. 5 and 6 show in phantom two diagonal threaded tunnels that run diagonally from the top of the short adjustment rail to the set screw openings 46. Within these threaded tunnels 13 is placed adjustment rail set screw holding bolts. When the adjustment plate has been adjusted with the short adjustment rail set screw 48 then this set screw setting bolt is tightened against the set screw 48 to hold it in place. Also in phantom on FIGS. 5 and 6 in the center of the end of the short adjustment rail 40 is the short adjustment rail attachment opening 11. The short adjustment rail attachment opening 11 is threaded and adapted to hold the adjustment rail attachment bolt 23.

FIG. 8 is a top view of the long adjustment rail 54. FIG. 8 shows several adjustment rail attachment openings 42. These adjustment rail attachment openings 42 are adapted to attach the long adjustment rail 54 to the base plate 10. The adjustment rail openings 42 are adapted to hold the adjustment rail attachment bolts 44.

FIG. 9 shows the side view of the long adjustment rail 54. This side view of the long adjustment rail 54 shows three long adjustment rail set screw opening 46. These long adjustment rail set screw openings 46 pass through the long adjustment rail and are threaded. These are adapted to hold the long adjustment rail set screw 48. FIG. 9 shows the short attachment opening 19 which takes the adjustment rail attachment bolt 23. This adjustment rail bolt 23 passes through the short attachment opening 19 in the long adjustment rail 54 and threads into the adjustment rail attachment opening 11 in the short adjustment rail 40 to hold it securely in place.

FIGS. 8 and 9 show in phantoms threaded tunnels 13 that run from the top side of the adjustment rail to the long adjustment rail set screw opening 46. Within this threaded tunnel 13 is placed the set screw setting bolt 21. When the adjustment plate 32 has been adjusted with the long adjustment rail set screw 48 then this set screw setting bolt 21 is tightened against the set screw 48 to hold it in place.

In the embodiment shown in the drawings the rails fully encircle the adjustment plate. This however would not be necessary. The rails could be small protrusions from the base plate just large enough to hold a set screw. These protrusions however would have to be on all four sides of the base plate in order to adjust the adjustable plate in both directions in the horizontal plane. The protrusions could be attached to the base plate by screws or other methods or could even be cast becoming an integral part of the base plate. It should also be noted that the adjustable base plate does not necessarily need to be square or rectangle. The base plate could be in fact round as long as one has set screws on the four sides of the round plate in order to move it in both directions in the horizontal plane. (or vertical plane in case of horizontal broach machine)

FIG. 10 and 10a shows the invention and shows how all the parts fits together. In operation the base plate 10 is attached to the retriever base or puller head of the broach machine by passing the base plate attachment bolts through the attachment opening 28 in the base plate 10 and threading the adjustment plate attachment bolts into the retriever base or puller head of the broach machine. Next the long adjustment rail 54 are attached to the base plate 10 with the adjustment rail bolts 44 being pass through the long adjustment rail openings 42 and being threaded tightly into the rail attachment openings 30. Then the short adjustment rails 40 are placed as shown in FIG. 10 and they are attached to the base plate 10 by passing the adjustment rail attachment bolts 44 through the adjustment rail attachment openings 42. Also to hold them more firmly in place the adjustment rail attachment bolts 23 are passed through the short attachment openings 19 and threaded into the short adjustment rail attachment openings 50. Then the adjustment plate 32 is placed between the long and short adjustment rails 54 and 40 as shown in FIG. 10. The adjustment plate 32 is then bolted to the base plate 10 by the adjustment plate attachment bolt 39 and washer 15 . These bolts only partially tighten and allow the adjustment plate 32 to be adjusted. Then the short adjustment rail set screw 48 are placed in the short adjustment rail openings 46 and the long adjustment rail set screws 48 are placed in the adjustment rail set screw opening 46. These set screws make contact with the adjustment plate 32 and can move the adjustment plate 32. The set screws 48 can adjust the adjustment plate 32 in all directions in the plane. Once the broach stick retriever or puller end is attached to the adjustment plate 32 and the adjustment plate 32 is properly adjusted through the short and long adjustment rail set screws 48, the adjustment plate attachment bolts 39 are tighten down. Then the broach machine has been fully adjusted and is ready for operation.

Changes and modifications in the specificity described embodiments can be carried out without departing from the scope of the invention which is intended to limited only by the scope of the appending claims.

I claim:

1. An adjustable mechanism for aligning a broach tool for a broach machine comprising:
   a. a plate; and,
   b. a first attachment means for attaching the plate to the broach machine; and,
   c. a second attachment means for attaching the plate to the broach tool such that when the plate is moved for adjustment the broach tool moves for adjustment; and,
   d. rails attached to the broach machine around the plate; and,
   e. a protrusion means that protrudes from the rails and that makes contact with the plate and can move the plate in a plane perpendicular to the center line of the broach tool.

2. An adjustable mechanism for aligning a broach tool for a broach machine as in claim 1 wherein:

a. the second attachment means for attaching the plate to the broach tool allows the plate to move for adjustment.

3. An adjustable mechanism for aligning a broach tool for a broach machine as in claim 2 wherein:

a. the first attachment means for attaching the plate to the broach machine comprises:
   (1) a set of openings in the plate; and,
   (2) screws adapted to pass through said openings, said body of the screws being smaller than the openings and said head of the screws being larger than the openings; and,
   (3) a threaded means for attaching the screws to the broach machine; and,
   (4) whereby when the plate is to be adjusted the screws are loosened and the plate is adjusted in the desired direction and then the screws are tightened to hold the plate in that position.

4. An adjustable mechanism for aligning a broach tool for a broach machine as in claim 3 wherein:

a. the threaded means for attaching the screws to the broach machine is a base plate with threaded openings that the screws are adapted to thread within and said base plate is securely attached to the broach machine.

5. An adjustable mechanism for aligning a broach tool for a broach machine as in claim 4 wherein:

a. the protrusion means for protruding from the rails comprises:
   (1) threaded openings in the rails; and,
   (2) screws that are adapted to fit within the threaded openings in the rails, said screws being of sufficient length that they make contact with the plate; and,
   (3) whereby the screws maybe threaded in or out of the openings in the rails and said screws makes contact with the plate and moves the plate in the desire direction of adjustment.

6. An adjustable mechanism for aligning a broach tool for a broach machine as in claim 3 wherein:

a. the protrusion means for protruding from the rails comprises:
   (1) threaded openings in the rails; and,
   (2) screws that are adapted to fit within the threaded openings in the rails, said screws being of sufficient length that they make contact with the plate; and,
   (3) whereby the screws may be threaded in or out of the openings in the rails and said screws make contact with the plate and move the plate in the desired direction of adjustment.

7. An adjustable mechanism for aligning a broach tool for a broach machine as in claim 2 wherein:

a. the first attachment means for attaching the plate to the broach machine comprises:
   (1) a set of openings in the plate that are elliptical; and,
   (2) washers which are circular and whose openings are elliptical; and,
   (3) screws adapted to pass through said washers and said openings whose body is smaller than the openings of the washer and openings and whose head is larger than the openings in the washer; and,
   (4) a threaded means for attaching the screws to the broach machine; and,
   (5) whereby when the plate is to be adjusted the screws are loosened and the plate is adjusted in the desired direction and then the screws are tightened to hold the plate in position.

8. An adjustable mechanism for aligning a broach tool for a broach machine as in claim 7 wherein:

a. the threaded means for attaching the screws to the broach machine is a base plate with threaded openings that the screws are adapted to thread within and said base plate is attached securely to the broach machine.

9. An adjustable mechanism for aligning a broach tool for a broach machine as in claim 7 wherein:

a. the protrusion means for protruding from the rails comprises:
   (1) threaded openings in the rails; and,
   (2) screws that are adapted to fit within the threaded openings in the rails, said screws being of sufficient length that they make contact with the plate; and,
   (3) whereby the screws may be threaded in or out of the openings in the rails and said screws make contact with the plate and move the plate in the desired direction of adjustment.

10. An adjustable mechanism for aligning a broach tool for a broach machine as in claim 1 wherein:

a. the protrusion means for protruding from the rails comprises:
    (1) threaded openings in the rails; and,
    (2) screws that are adapted to fit within the threaded openings in the rails, said screws being of sufficient length that they make contact with the plate; and,
    (3) whereby the screws may be threaded in or out of the openings in the rails and said screws make contact with the plate and move the plate in the desired direction of adjustment.

11. An adjustable mechanism for aligning a broach tool for a broach machine as in claim 10 wherein:

a. the plate is square.

12. An adjustable mechanism for aligning a broach tool for a broach machine as in claim 11 wherein:

a. the rails are four in number and run parallel to the sides of the square plate.

13. An adjustable mechanism for aligning a broach tool for a broach machine as in claim 10 wherein:

a. the screws make contact with opposing sides of the plate.

14. An adjustable mechanism for aligning a broach tool for a broach machine as in claim 1 wherein:

a. the plate is square.

* * * * *